United States Patent
Xu et al.

(10) Patent No.: US 12,536,250 B2
(45) Date of Patent: Jan. 27, 2026

(54) ELECTRONIC DEVICE AND METHOD FOR SMOKE LEVEL ESTIMATION

(71) Applicant: SONY GROUP CORPORATION, Tokyo (JP)

(72) Inventors: Wanxin Xu, San Jose, CA (US); Ko-Kai Albert Huang, Cupertino, CA (US)

(73) Assignee: SONY GROUP CORPORATION, Tokyo (JP)

( * ) Notice: Subject to any disclaimer, the term of this patent is extended or adjusted under 35 U.S.C. 154(b) by 492 days.

(21) Appl. No.: 17/246,092

(22) Filed: Apr. 30, 2021

(65) Prior Publication Data

US 2022/0346855 A1 Nov. 3, 2022

(51) Int. Cl.
| | |
|---|---|
| *G06F 18/21* | (2023.01) |
| *A61B 18/00* | (2006.01) |
| *A61B 18/14* | (2006.01) |
| *G06F 18/214* | (2023.01) |
| *G06F 18/2431* | (2023.01) |

(Continued)

(52) U.S. Cl.
CPC .......... *G06F 18/2193* (2023.01); *A61B 18/14* (2013.01); *G06F 18/2148* (2023.01); *G06F 18/2178* (2023.01); *G06F 18/2431* (2023.01); *G06T 5/50* (2013.01); *G06T 5/92* (2024.01); *G06V 10/273* (2022.01); *G06V 10/462* (2022.01); *A61B 2018/00595* (2013.01); *A61B 2218/008* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | |
|---|---|---|
| 9,805,472 B2 | 10/2017 | Chou et al. |
| 9,905,000 B2 | 2/2018 | Chou et al. |

(Continued)

FOREIGN PATENT DOCUMENTS

| | | | | |
|---|---|---|---|---|
| CN | 104766433 A | * | 7/2015 | ............. G08B 17/00 |
| CN | 109147254 A | | 1/2019 | |

(Continued)

OTHER PUBLICATIONS

Yin, et al., "A Deep Normalization and Convolutional Neural Network for Image Smoke Detection", IEEE Access, vol. 5, Sep. 27, 2017, pp. 18429-18438.

(Continued)

*Primary Examiner* — Ming Y Hon
*Assistant Examiner* — Amanda H Pearson
(74) *Attorney, Agent, or Firm* — CHIP LAW GROUP

(57) ABSTRACT

An electronic device for smoke estimation is provided. The electronic device receives a first image of a plurality of images of a physical space. The electronic device detects smoke in the physical space based on an application of a trained neural network model on the received first image. The electronic device generates a heatmap of the physical space based on the detected smoke in the physical space, and further based on an output of the trained neural network model corresponding to the detection of the smoke. The electronic device estimates a level of the smoke in the physical space based on a normalization of the generated heatmap.

20 Claims, 6 Drawing Sheets

(51) Int. Cl.
  *G06T 5/50* (2006.01)
  *G06T 5/92* (2024.01)
  *G06V 10/26* (2022.01)
  *G06V 10/46* (2022.01)

(56) References Cited

U.S. PATENT DOCUMENTS

| | | | |
|---|---|---|---|
| 2013/0087134 A1* | 4/2013 | Mikulec | F24C 15/2021 |
| | | | 126/299 D |
| 2016/0247275 A1 | 8/2016 | Chou et al. | |
| 2016/0259888 A1 | 9/2016 | Liu et al. | |
| 2016/0290912 A1* | 10/2016 | Kent | G01N 35/00871 |
| 2017/0289504 A1* | 10/2017 | Fridental | H04N 7/181 |
| 2018/0004231 A1* | 1/2018 | Michini | G05D 1/0094 |
| 2019/0293539 A1* | 9/2019 | Manautou | G01N 33/4925 |
| 2019/0362126 A1 | 11/2019 | Lapczynski et al. | |
| 2019/0384980 A1 | 12/2019 | Chen et al. | |
| 2020/0022687 A1* | 1/2020 | Takemoto | G06T 7/0012 |
| 2020/0397509 A1 | 12/2020 | Chen et al. | |
| 2022/0147748 A1* | 5/2022 | Nagori | G06V 40/10 |
| 2022/0284703 A1* | 9/2022 | Lopez | G06V 10/22 |

FOREIGN PATENT DOCUMENTS

| | | | | |
|---|---|---|---|---|
| CN | 109345760 A | | 2/2019 | |
| CN | 109598891 A | | 4/2019 | |
| CN | 111126136 A | | 5/2020 | |
| CN | 111401246 A | | 7/2020 | |
| CN | 111428694 A | * | 7/2020 | |
| CN | 111553403 A | | 8/2020 | |
| CN | 111898525 A | | 11/2020 | |
| CN | 112232107 A | * | 1/2021 | |
| CN | 112258403 A | | 1/2021 | |
| CN | 112381723 A | | 2/2021 | |
| JP | 2011070590 A | * | 4/2011 | ............ G08B 17/00 |
| KR | 101869442 B1 | * | 6/2018 | ............... G06T 7/11 |
| WO | 2020/025696 A1 | | 2/2020 | |

OTHER PUBLICATIONS

Chen L et al., "De-smokeGCN: Generative Cooperative Networks for Joint Surgical Smoke Detection and Removal", IEEE Transactions on Medical Imaging, vol. 39, No. 5, May 2020.

* cited by examiner

ELECTRONIC DEVICE AND METHOD FOR SMOKE LEVEL ESTIMATION

CROSS-REFERENCE TO RELATED APPLICATIONS/INCORPORATION BY REFERENCE

None.

FIELD

Various embodiments of the disclosure relate to estimation of smoke level. More specifically, various embodiments of the disclosure relate to an electronic device and method for estimation of smoke level.

BACKGROUND

Advancements in medical technology have led to various developments in health and medical services, such as, surgical procedures. Conventionally, an electrosurgery device (such as an electrocautery device) may be utilized by surgeons during a surgical procedure. A common by-product of using the electrocautery device may be surgical smoke. The surgical smoke may be produced due to destruction of tissues by application of heat from a probe of the electrocautery device during the surgical procedure. Typically, the surgical smoke may be dense and localized at a surgical site where the surgical procedure is being performed, and may hamper visibility of the surgical site during the surgical procedure. Further, frequent exposure to the surgical smoke may cause adverse health effects to personnel who inhale the surgical smoke, such as the surgeons and assisting staff. In some cases, high concentration of the surgical smoke may cause irritation in eyes and upper respiratory tract of the surgeons and assisting staff.

Conventional methods for detection of smoke in an operation room or a surgical site may require additional hardware, such as specialized sensors, which may increase installation cost and maintenance cost of such hardware. Such methods also yield inaccurate results for real-time detection of smoke due to high-intensity light in the operation room. In conventional methods, removal of the smoke from the operation room may involve manual activation of smoke removal equipment from time-to-time. Manual activation of the smoke removal equipment during the procedure may be inconvenient to the surgeons and the assisting staff. Further, such manual methods of smoke removal may be not precise or effective in the removal of the smoke from the surgical site or the operation room.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method of smoke level estimation is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
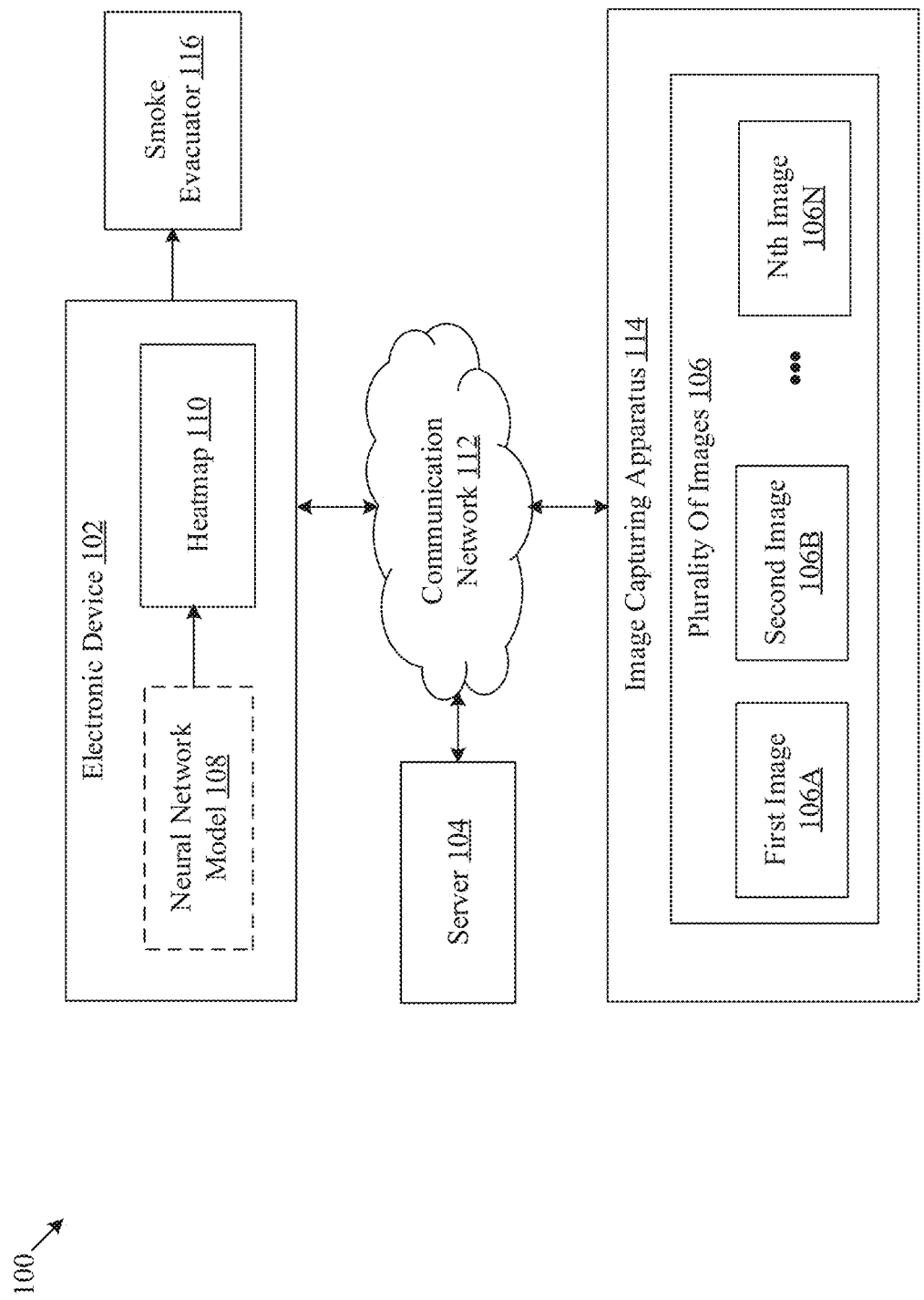
FIG. 1 is a block diagram that illustrates an exemplary network environment for smoke level estimation, in accordance with an embodiment of the disclosure.

The following described implementations may be found in the disclosed electronic device and method for smoke level estimation in a physical space. Exemplary aspects of the disclosure provide an electronic device that may be configured to receive a first image of a plurality of images of the physical space (for example, a surgical site or an operation room). The electronic device may be configured to apply a trained neural network model on the received first image. Based on the application of the trained neural network model, the electronic device may be configured to detect smoke in the physical space. The electronic device may be configured to generate a heatmap of the physical space based on the detected smoke in the physical space, and further based on an output of the trained neural network model corresponding to the detection of the smoke. The electronic device may be configured to estimate a level of the smoke in the physical space based on the normalization of the generated heatmap.

In accordance with an embodiment, the electronic device may be configured to classify the smoke corresponding to each subset of pixels of the received first image into a specific category among a plurality of categories of intensity of the smoke. The classification may be based on a confidence score of the trained neural network model corresponding to each subset of pixels. The electronic device may be configured to assign weights to the heatmap based on the classification of the smoke. The electronic device may be further configured to determine a plurality of regions, each corresponding to the specific category of the plurality of categories, based on the assigned weights. Each region of the plurality of regions may include the subset of pixels classified into the specific category (such as light smoke, medium smoke, or heavy smoke).

In accordance with an embodiment, the electronic device may be further configured to determine one or more overlapping regions between the determined plurality of regions. The electronic device may be further configured to eliminate the one or more overlapping regions from the heatmap. The electronic device may be further configured to estimate the level of the smoke in the physical space based on the elimination of the one or more overlapping regions. In accordance with an embodiment, the electronic device may be configured to control a smoke evacuator to evacuate the smoke from the physical space based on the estimated level of the smoke.

The electronic device may estimate the level of the smoke by utilization of the trained neural network model, and thus, may eliminate the need of use of additional hardware (such as specialized sensors) for smoke detection. The use of the trained neural network model may improve the accuracy of real-time estimation of the smoke during a surgical procedure. The electronic device may automatically control the smoke evacuator (such as automatically switch-on or switch-off the smoke evacuator) to evacuate the smoke from the physical space based on the estimated level of the smoke, and thereby improve visibility of the surgical site during the surgical procedure, and provide a health working environment for the surgeons and the assisting staff. The automatic control of the smoke evacuator may allow evacuation of the smoke from the operation room without manual effort of the surgical staff, thereby improving user convenience, precision, and accuracy of the removal of the smoke from the physical space. Thus, the electronic device may provide a robust technique for smoke level estimation and smoke evacuation from the physical space (such as the surgical site or the operation room).

FIG. 1 is a block diagram that illustrates an exemplary network environment for smoke level estimation, in accordance with an embodiment of the disclosure. With reference to FIG. 1, there is shown a network environment 100. The network environment 100 may include an electronic device 102, a server 104, an image capturing apparatus 114, and a smoke evacuator 116. The electronic device 102 may include a neural network model 108 configured to generate a heatmap 110. The image capturing apparatus 114 may capture a plurality of images 106, such as a first image 106A, a second image 106B, and an Nth image 106N. The network environment 100 may further include a communication network 112. The electronic device 102, the server 104, the image capturing apparatus 114, and the smoke evacuator 116 may communicate with each other via the communication network 112.

The electronic device 102 may include suitable logic, circuitry, and interfaces that may be configured to estimate the level of the smoke in the physical space (such as a surgical site or an operation room) by application of the trained neural network model 108. The electronic device 102 may be further configured to control the smoke evacuator 116 to evacuate the smoke from the physical space based on the estimated level of the smoke. In an embodiment, the electronic device 102 may be configured to receive the trained neural network model 108 from the server 104. In another embodiment, the electronic device 102 may be further configured to generate the neural network model 108, and train the neural network model based on training data. In some cases, the electronic device 102 may receive the training data (such as one or more features related to smoke) from the server 104. The electronic device 102 may further control activation of the image capturing apparatus 114 and control one or more imaging parameters of the image capturing apparatus 114, and may receive the plurality of images 106 from the image capturing apparatus 114 based on the control. Examples of the electronic device 102 may include, but are not limited to, a computing device, a smartphone, an electronic healthcare device, a cellular phone, a mobile phone, a gaming device, a mainframe machine, a server, a computer work-station, and/or a consumer electronic (CE) device.

The server 104 may include suitable logic, circuitry, and interfaces, and/or code that may be configured to store a plurality of neural network models for various applications. For example, the plurality of neural network models may include the neural network model 108 that may be trained using one or more features for smoke detection. The server 104 may transmit the trained the neural network model 108 to the electronic device 102. The server 104 may communicate with multiple electronic devices (such the electronic device 102) to gather information for periodically generating new training data. The server 104 may periodically transmit the generated training data to the electronic device 102. The server 104 may be implemented as a cloud server and may execute operations through web applications, cloud applications, hypertext transfer protocol (HTTP) requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and electronic device 102 as two separate entities. In certain embodiments, the functionalities of the server 104 may be incorporated in its entirety or at least partially in the electronic device 102, without departing from the scope of the disclosure.

The neural network model 108 (such as a deep neural network) may be defined by its hyper-parameters, for example, activation function(s), number of weights, cost function, regularization function, input size, number of layers, and the like. The neural network model 108 may be a computational network or a system of artificial neurons, arranged in a plurality of layers, as nodes. The plurality of layers of the neural network model 108 may include an input layer, one or more hidden layers, and an output layer. Each layer of the plurality of layers may include one or more nodes (or artificial neurons, represented by circles, for example). Outputs of all nodes in the input layer may be coupled to at least one node of the hidden layer(s). Similarly, inputs of each hidden layer may be coupled to outputs of at least one node in other layers of the neural network model 108. Outputs of each hidden layer may be coupled to inputs of at least one node in other layers of the neural network model 108. Node(s) in the final layer may receive inputs from at least one hidden layer to output a result. The number of layers and the number of nodes in each layer may be determined based on parameters of the neural network model 108. Such parameters may be set before, while, or after training the neural network model 108. In accordance with an embodiment, the electronic device 102 may be configured to train the neural network model 108 for smoke detection based on the plurality of images 106, smoke classification (such as light smoke, medium smoke, or heavy smoke) based on a heatmap, and smoke level estimation. In another embodiment, the server 104 may be configured to train the neural network model 108, and may periodically update the neural network model 108 hosted on the electronic device 102.

Each node of the neural network model 108 may correspond to a mathematical function (e.g., a sigmoid function or a rectified linear unit) with a set of parameters, tunable during training of the neural network model 108. The set of parameters may include, for example, a weight parameter, a regularization parameter, and the like. Each node may use the mathematical function to compute an output based on one or more inputs from nodes in other layer(s) (e.g., previous layer(s)) of the neural network model 108. All or some of the nodes of the neural network model 108 may correspond to the same or a different mathematical function.

In accordance with an embodiment, the electronic device 102 may train the neural network model 108 on one or more features related to one or more subsets of pixels in the received first image 106A to obtain the trained neural network model 108. The neural network model 108 may be trained to detect the smoke and to generate the heatmap 110. The one or more features may include at least one of an intensity of the smoke in the one or more subsets of pixels, a shape of the smoke in the one or more subsets of pixels, or a color of the smoke in the one or more subsets of pixels. For example, the electronic device 102 may input several images to the neural network model 108 to train the neural network model 108. For example, the images may include images of different shapes of smoke, different colors of smoke, and different types of smoke (such as heavy smoke, medium smoke, light smoke), and so forth. The neural network model 108 may be trained to detect the smoke based on the input images to classify the smoke, and to estimate the level of the smoke. In another embodiment, the neural network model 108 may be pre-trained for the detection of the smoke based on features of a training dataset, such as, the intensity of the smoke, the shape of the smoke, or the color of the smoke In training of the neural network model 108, one or more parameters of each node of the neural network model 108 may be updated based on whether an output of the final layer (such as the smoke level estimation) for a given input (such as the first image 106A of the smoke) matches a correct result (such as a ground truth image corresponding to the smoke level estimation) based on a loss function for the neural network model 108. The above process may be repeated for same or a different input till a minima of loss function is achieved, and a training error is minimized. Several methods for training are known in art, and may include, for example, but are not limited to, gradient descent, stochastic gradient descent, batch gradient descent, gradient boost, meta-heuristics, and the like.

In an embodiment, the neural network model 108 may include electronic data, which may be implemented as, for example, a software component of an application executable on the electronic device 102. The neural network model 108 may rely on libraries, external scripts, or other logic/instructions for execution by a processing device, such as the electronic device 102. The neural network model 108 may enable a computing device, such as the electronic device 102 to perform one or more operations associated with detection of the smoke and generation of the heatmap 110. Additionally, or alternatively, the neural network model 108 may be implemented using hardware including a processor, a co-processor (such as an Artificial Intelligence (AI) accelerator chip), a microprocessor, a field-programmable gate array (FPGA), or an application-specific integrated circuit (ASIC). In some embodiments, the neural network model 108 may be implemented using a combination of both hardware and software.

Examples of the neural network model 108 may include, but are not limited to, a deep neural network (DNN), a convolutional neural network (CNN), a CNN-recurrent neural network (CNN-RNN), R-CNN, Fast R-CNN, Faster R-CNN, a You Only Look Once (YOLO) network (such as YOLOv3), CNN+ANN, a Generative Adversarial Network (GAN), and/or a combination of such networks. In certain embodiments, the neural network model 108 may be based on a hybrid architecture of multiple Deep Neural Networks (DNNs).

Although in FIG. 1, the neural network model 108 is shown integrated with the electronic device 102, the disclosure is not so limited. Accordingly, in some embodiments, the neural network model 108 may be separate from the electronic device 102, without deviating from scope of the disclosure.

The heatmap 110 may be a graphical representation of a magnitude or an intensity of the detected smoke in the physical space based on the first image 106A of the plurality of images 106 using a color coding technique. The electronic device 102 may be configured to generate the heatmap 110 based on the detected smoke in the physical space, and based on a classification (such as heavy smoke, medium smoke, or light smoke) of the detected smoke by the trained neural network model 108. The heatmap 110 may utilize the color coding technique to represent different values of pixels in the first image 106A. For example, the heatmap 110 may include a different color for each subset of pixels of a plurality of pixels of the received first image 106A as the output of the trained neural network model 108. In an embodiment, the heatmap 110 may be weighted based on a confidence score of the smoke detection by the trained neural network model 108. For example, weights may be assigned to the heatmap 110 based on the classification of the smoke into a specific category among a plurality of categories of intensity of the smoke. The weighted heatmap 110 may be used to quantify the smoke in the physical space for estimation of the smoke level. Details of the heatmap 110 and the assignment of weights are further described, for example, in FIGS. 3A and 3B.

The communication network 112 may include a communication medium through which the electronic device 102, the server 104, the image capturing apparatus 114, and the smoke evacuator 116 may communicate with each other. For example, the electronic device 102 may receive the plurality of images 106 (such as the first image 106A) from the image capturing apparatus 114 via the communication network 112. In another example, the electronic device 102 may receive training data for the neural network model 108 from the server 104 via the communication network 112. The communication network 112 may be one of a wired connection or a wireless connection. Examples of the communication network 112 may include, but are not limited to, the Internet, a cloud network, a Wireless Fidelity (Wi-Fi) network, a mobile wireless network (such as Long-term Evolution or 5th Generation New Radio (5G NR)), a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The image capturing apparatus 114 may include suitable logic, circuitry, and interfaces, and/or code that may be configured to capture the plurality of images 106 based on control signals from the electronic device 102. The image capturing apparatus 114 may include one or more parameters, such as, resolution, field of view, frame rate (for example, frames per second), magnification, and so on. The parameters of the image capturing apparatus 114 may be controlled by the electronic device 102. In one or more embodiments, the image capturing apparatus 114 may record and transmit a plurality of frames (such as the plurality of images 106) of a video of the surgical procedure to the electronic device 102 or to the server 104 for storage. Examples of the image capturing apparatus 114 may include, but are not limited to, an image sensor, a wide-angle camera, an action camera, a closed-circuit television (CCTV) camera, a camcorder, a digital camera, camera phones, a time-of-flight camera (ToF camera), a night-vision camera, an omnidirectional camera, a panoramic camera, an action camera, a wide-angle camera, a closed-circuit television (CCTV) camera, other image capturing devices with 360-degree view capturing capability, or other image capture devices.

The smoke evacuator 116 may include suitable logic, circuitry, and interfaces, hardware components, and/or code to evacuate the smoke from the physical space (such as the surgical site or the operation room) based on the estimated level of the detected smoke. The smoke evacuator 116 may include a housing, one or more suction fans, a variable speed motor coupled to the suction fans, one or more suction tubes of different diameters removably attached to the housing, one or more air filters downstream of the suction tubes, and other components depending on the application (such as a laparoscopic surgery application). A person of ordinary skill in the art will understand that the smoke evacuator 116 may also include other suitable components or systems, in addition to the components or systems described herein. A detailed description for the other components or systems of the has been omitted from the disclosure for the sake of brevity. In an embodiment, the activation and deactivation of the smoke evacuator 116 may be controlled by the electronic device 102 based on the estimated level of the detected smoke in the physical space. In another embodiment, the speed of the motor and the suction fans of the smoke evacuator 116 may be controlled by the electronic device 102 based on the estimated level of the detected smoke in the physical space.

In operation, the image capturing apparatus 114 may be configured to capture a plurality of images 106 of the physical space (such as a surgical site or an operation room) during a surgical procedure. For example, the surgical procedure may be performed by one or more surgeons and an assisting staff. In another example, the surgical procedure may be a robot-assisted surgery, in which a robotic system may assist the surgeons to perform the surgical procedure remotely or in the operation room. The surgical procedure may involve use of an electrosurgery device (such as an electrocautery device) to cauterize tissues of a patient. In such a case, smoke (such as surgical smoke) may be emitted at the surgical site by the use of the electrocautery device. In some embodiments, the image capturing apparatus 114 may capture a video of the surgical procedure in real time for assistance in the surgical procedure.

The electronic device 102 may be configured to receive a first image 106A of the plurality of images 106 of the physical space (such as the surgical site or the operation room) from the image capturing apparatus 114. For example, the plurality of images 106 may be different frames of the video of the surgical procedure captured by the image capturing apparatus 114. In accordance with an embodiment, the electronic device 102 may be configured to receive the first image 106A of the plurality of images 106 from at least one of an image capturing apparatus 114 in real time, a memory of the electronic device 102, or the server 104 via the communication network 112. Details of the reception of the first image 106A are further described, for example, in FIG. 3A.

The electronic device 102 may be further configured to apply the trained neural network model 108 on the received first image 106A. Based on the application of the trained neural network model 108, the electronic device 102 may be configured to detect smoke in the physical space. Details of the detection of the smoke are further provided, for example, in FIG. 3A.

The electronic device 102 may be configured to generate the heatmap 110 of the physical space (such as the surgical site or the operation room) based on the detected smoke in the physical space, and further based on an output of the trained neural network model 108 corresponding to the detection of the smoke. In accordance with an embodiment, the electronic device 102 may be configured to obtain a confidence score corresponding to each subset of pixels of a plurality of pixels of the received first image 106A as the output of the trained neural network model 108. The confidence score may be associated with the detection of the smoke corresponding to each subset of pixels of the received first image 106A. The electronic device 102 may generate the heatmap 110 based on the confidence score for each subset of pixels. Details of the generation of the heatmap 110 are further provided for example, in FIG. 3A.

In accordance with an embodiment, the electronic device 102 may be configured to classify, based on the trained neural network model 108, the smoke corresponding to each subset of pixels of the received first image 106A into a specific category among a plurality of categories of intensity of the smoke. The classification may be based on the confidence score corresponding to each subset of pixels. For example, the plurality of categories of the intensity of the smoke may include a light smoke, a medium smoke, and a heavy smoke. The electronic device 102 may further assign weights to the heatmap 110 based on the classification of the smoke. Details of the classification of the smoke and assignment of the weights are further provided for example, in FIG. 3A.

In accordance with an embodiment, the electronic device 102 may further determine a plurality of regions, each corresponding to the specific category of the plurality of categories, based on the assigned weights, Each region of the plurality of regions may include the subset of pixels classified into the specific category. The electronic device 102 may further determine one or more overlapping regions between the determined plurality of regions and eliminate the overlapping regions from the heatmap 110. Details of the determination of the plurality of regions and the elimination of the overlapping regions are further provided, for example, in FIGS. 3A and 3B.

The electronic device 102 may further normalize the heatmap 110 after elimination of the overlapping regions. For example, the normalization of the heatmap may include adjustment of values of the heatmap to a range of 0 to 1. Based on the normalization, the electronic device 102 may estimate the level of the smoke in the physical space. In some embodiments, the estimated level of smoke in the first image 106A of the physical space may be in a range of 0 to 1. Details of the estimation of the level of smoke are further provided, for example, in FIG. 3B.

In accordance with an embodiment, the electronic device 102 may be further configured to control the smoke evacuator 116 to evacuate the smoke from the physical space based on the estimated level of the smoke. Details of the control of the smoke evacuator 116 are further provided, for example, in FIG. 3B.

In accordance with an embodiment, the electronic device 102 may be configured to control the display screen to display the first image 106A indicating a first visibility level of the physical space based on the estimated level of the smoke. The electronic device 102 may further control the smoke evacuator 116 to evacuate the smoke from the physical space in case the first visibility level is lower than a visibility threshold. The electronic device 102 may control the display screen to display a second image (such as the second image 106B) of the plurality of images 106 of the physical space based on the evacuation of the smoke. The second image 106B may indicate a second visibility level greater than or equal to the visibility threshold. Details of the control of the smoke evacuator 116 to evacuate the smoke are further provided, for example, in FIG. 4A.

In accordance with an embodiment, the electronic device 102 may be configured to control the display screen to display the first image 106A indicating the first visibility level of the physical space based on the estimated level of the smoke. The electronic device 102 may further apply a dehazing process on the first image 106A in case the first visibility level is lower than a visibility threshold. The electronic device 102 may further control the display screen to display the second image 106B of the plurality of images 106 of the physical space based on the application of the dehazing process. The second image 106B may indicate a second visibility level greater than or equal to the visibility threshold. For example, the second image 106B may be a dehazed first image 106A. Details of the application of the dehazing process are further provided, for example, in FIG. 4B.

Figure 2:
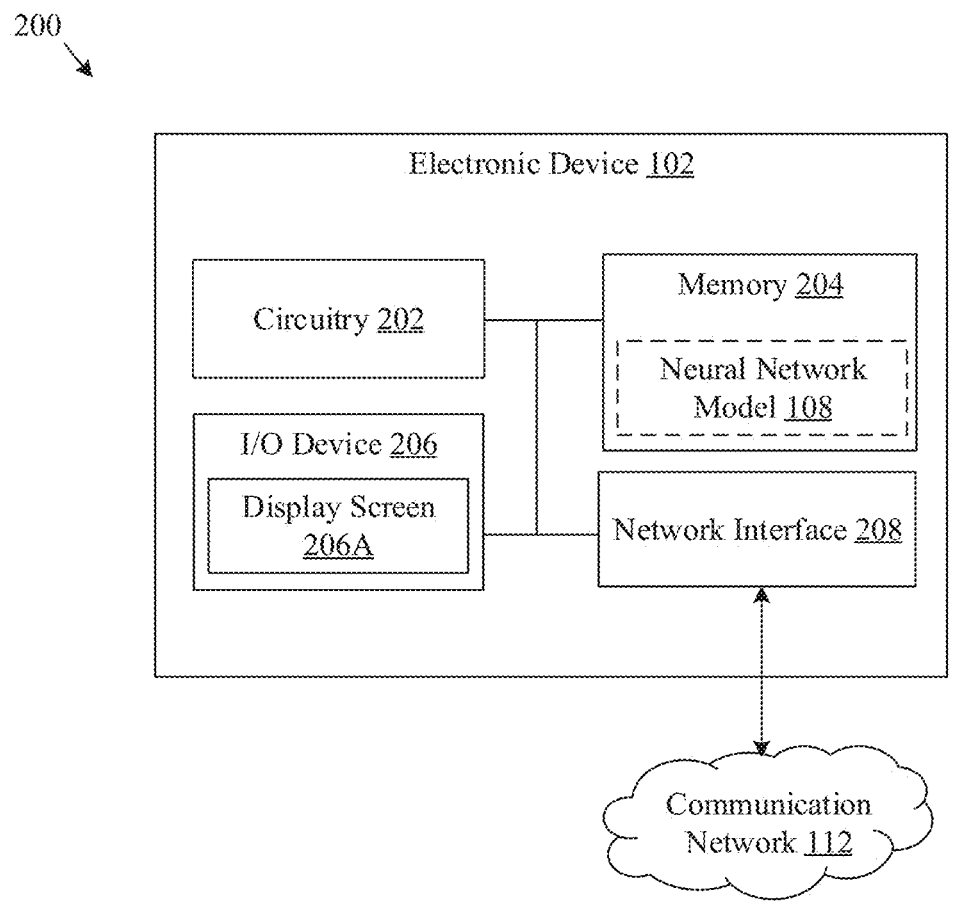
FIG. 2 is a block diagram that illustrates an exemplary electronic device for smoke level estimation, in accordance with an embodiment of the disclosure.

FIG. 2 is a block diagram that illustrates an exemplary electronic device for smoke level estimation, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an Input/Output (I/O) device 206, and a network interface 208. The circuitry 202 may be communicatively coupled to the memory 204, the I/O device 206, and the network interface 208. In some embodiments, the memory 204 may include the neural network model 108. The I/O device 206 may further include a display screen 206A.

The circuitry 202 may include suitable logic, circuitry, and interfaces that may be configured to execute program instructions associated with different operations to be executed by the electronic device 102. For example, the circuitry 202 may be configured to apply the trained neural network model 108 on an image (such as the first image 106A) of the physical space to detect smoke in the physical space, generate a weighted heatmap (such as the heatmap 110) based on the detected smoke, and estimate a level of the smoke based on a normalization of the weighted heatmap. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the program instructions to be executed by the circuitry 202. The memory 204 may be configured to store the neural network model 108. The memory 204 may be configured to store the plurality of images 106 received from the image capturing apparatus 114 and the generated heatmap 110. The memory 204 may be further configured to store the training data received from the server 104 for training the neural network model 108. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input from a user (such as a surgeon or surgical staff) and provide an output (such as display the first image 106A) based on the received input. The I/O device 206 which may include various input and output devices, may be configured to communicate with the circuitry 202. For example, the I/O device 206 may receive a user input to detect smoke of a user-defined category among the plurality of categories of intensity of the smoke (such as heavy smoke, medium smoke, or light smoke). The I/O device 206 may further include the display screen 206A which may display the first image 106A indicating a first visibility level of the physical space. The display screen 206A may further display the second image 106B which may indicate a second visibility level of the physical space, different from the first visibility level. Examples of the I/O device 206 may include, but are not limited to, a touch screen, a display device, a keyboard, a mouse, a joystick, a microphone, and a speaker.

The network interface 208 may include suitable logic, circuitry, and interfaces that may be configured to facilitate communication between the circuitry 202, the server 104, the image capturing apparatus 114, and the smoke evacuator 116 via the communication network 112. The network interface 208 may be further configured to connect the circuitry 202 to the image capturing apparatus 114 and the smoke evacuator 116 via a wireless connection (such as Bluetooth™) or a wired connection (such as a local area network (LAN) cable). The network interface 208 may be implemented by use of various known technologies to support wired or wireless communication of the electronic device 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5G NR, code division multiple access (CDMA), time division multiple access (TDMA), Bluetooth™, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the electronic device 102, as described in FIG. 1, may be performed by the circuitry 202. Operations executed by the circuitry 202 are described in detail, for example, in FIGS. 3A, 3B, 4A and 4B.

Figure 3A:
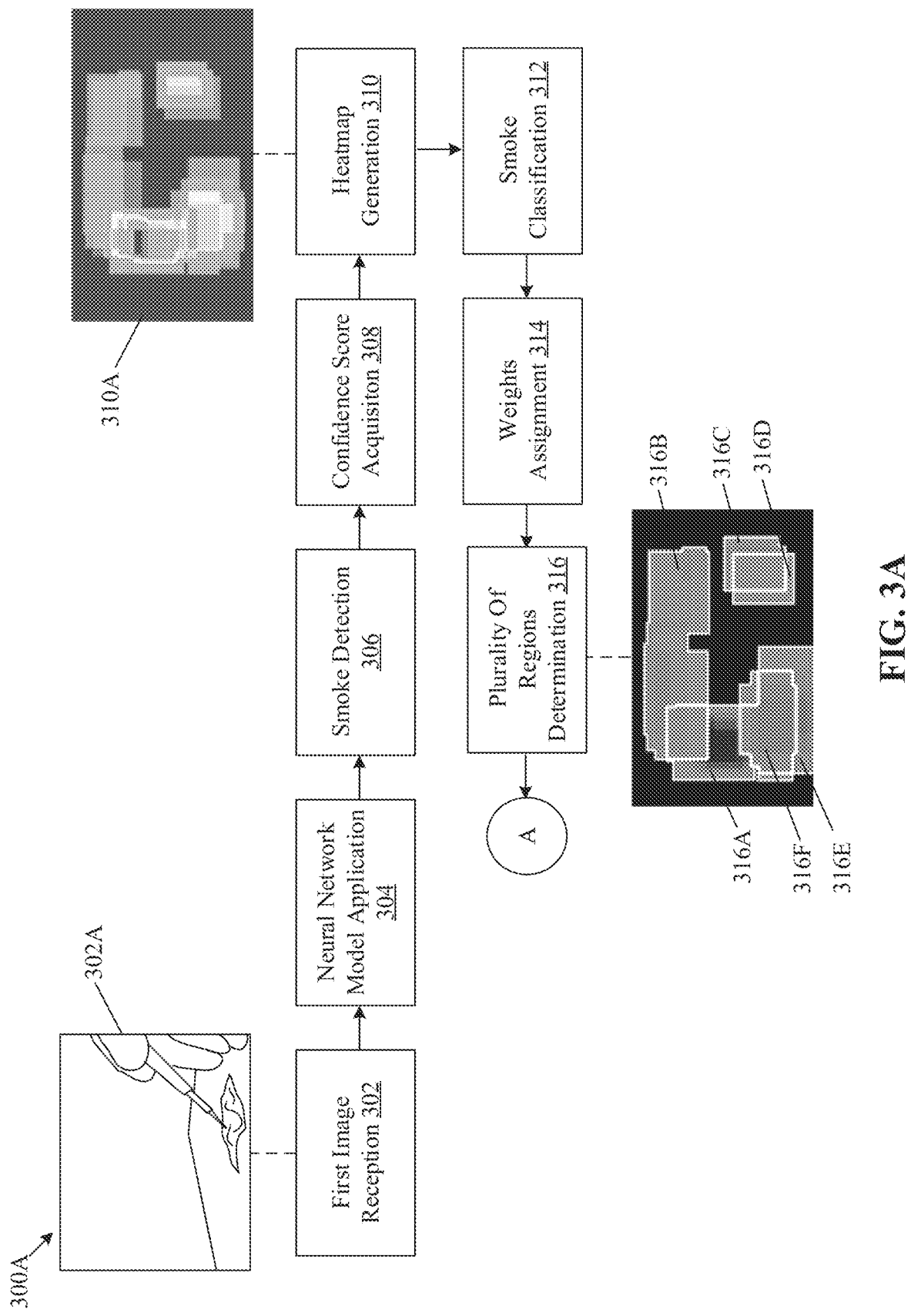
FIGS. 3A and 3B collectively illustrate exemplary operations for smoke level estimation, in accordance with an embodiment of the disclosure.

FIG. 3A illustrates exemplary operations for smoke level estimation, in accordance with an embodiment of the disclosure. FIG. 3A is explained in conjunction with elements from FIG. 1 and FIG. 2. With reference to FIG. 3A, there is shown a block diagram 300A that illustrates exemplary operations from 302 to 316, as described herein. The exemplary operations illustrated in the block diagram 300A may start at 302 and may be performed by any computing system, apparatus, or device, such as, by the electronic device 102 of FIG. 1 or the circuitry 202 FIG. 2.

At 302, a first image 302A of the plurality of images 106 of the physical space may be received. In accordance with an embodiment, the circuitry 202 may be configured to receive the first image 302A of the plurality of images 106 from the image capturing apparatus 114. For example, the first image 302A may be an image of a surgical field (such as a surgical site of a patient) of a surgical procedure. In another example, the first image 302A may be an image of the operation room where the surgical procedure may be performed. The first image 106A may correspond to a first frame of video captured by the image capturing apparatus 114.

In accordance with an embodiment, the circuitry 202 may be configured to receive the first image 302A from the image capturing apparatus 114 in real time, in an online mode operation of the electronic device 102. The circuitry 202 may receive each frame of a plurality of frames (such as the plurality of images 106) of the video from the image capturing apparatus 114 in real time. In another embodiment, the circuitry 202 may be configured to receive the first image 302A from the memory 204 of the electronic device 102 or the server 104, in an offline mode operation of the electronic device 102.

At 304, the trained neural network model 108 may be applied on the received first image 302A. In accordance with an embodiment, the circuitry 202 may be configured to apply the trained neural network model 108 on the received first image 302A for detection of smoke in the physical space (such as the surgical site or the operation room). The circuitry 202 may input the first image 302A to the trained neural network model 108. In some embodiments, the circuitry 202 may apply the trained neural network model 108 to different regions (such as different subsets of pixels) in the received first image 302A for the detection of the smoke.

At 306, smoke may be detected in the physical space based on the application of the trained neural network model 108 on the first image 302A. In accordance with an embodiment, the circuitry 202 may be configured to detect the smoke in the physical space based on the application of the trained neural network model 108 on the first image 302A.

The trained neural network model 108 may detect the smoke in the physical space, by detection of the features, such as the intensity, the shape, and the color of smoke in one or more subsets of pixels of the received first image 302A. In an exemplary scenario, the first image 302A may depict the smoke emitted from the electrocautery device. The neural network model 108 may detect the smoke in the physical space, based on the detection of the smoke in the first image 302A.

At 308, a confidence score corresponding to each subset of pixels of the received first image 302A may be acquired. In accordance with an embodiment, the circuitry 202 may be configured to acquire the confidence score corresponding to each subset of pixels of the received first image 302A as the output of the trained neural network model 108. The confidence score may be associated with the detection of the smoke corresponding to each subset of pixels of the received first image 302A. In an example, the confidence score may specify a confidence with which the neural network model 108 detects the smoke in the input first image 302A. In some instances, the confidence score may be a binary value (0 or 1) or a floating-point number representing a likelihood between 0 and 1. A higher confidence score may denote a higher confidence level of the neural network model 108.

For example, the surgical procedure may be performed at an abdominal region of the patient in the operation room. The first image 302A may include a scene of the surgical procedure being performed at the abdominal region of the patient, and may include the smoke from the electrocautery device. The first image 302A may further include reflections of light from one or more light sources incident on the abdominal region of the patient. In an embodiment, one or more regions (such as one or more subsets of pixels) of the first image 302A may include the smoke and other regions of the first image 302A may include the reflections of light. The circuitry 202 may obtain the confidence score of the detection of smoke for each subset of pixels of the received first image 302A as the output of the trained neural network model 108. In an embodiment, the confidence score may be in range of 0 to 1.

For example, the neural network model 108 may detect smoke in a first subset of pixels of the first image 302A, and may output a confidence score of 0.95 corresponding to the detection of smoke in the first subset of pixels of the first image 302A. The circuitry 202 may obtain the confidence score of 0.95 corresponding to the detected smoke in the first subset of pixels. Further, the neural network model 108 may detect absence of smoke in a second subset of pixels of the first image 302A, and may output a confidence score of 0.90 corresponding to the detected absence of smoke in the second subset of pixels of the first image 302A. The circuitry 202 may obtain the confidence score of 0.90 corresponding to the detected absence of smoke in the second subset of pixels of the first image 302A.

In some embodiments, the neural network model 108 may compare the features of the smoke, such as the intensity, the shape, and the color of the smoke with features in a third subset of pixels of the plurality of pixels. For example, the neural network model 108 may detect the smoke in the third subset of pixels based on a matched intensity and a matched shape of the smoke in the third subset of pixels, whereas the color of the smoke may not match. In such a case, the neural network model 108 may output a lower confidence score (for example, 0.86) corresponding to the detection of smoke in the third subset of pixels. In an embodiment, the neural network model 108 may output the confidence score for each pixel of the plurality of pixels.

At 310, a heatmap 310A of the physical space may be generated based on the detected smoke in the physical space, and further based on the output (such as the confidence score) of the trained neural network model 108 corresponding to the detection of the smoke. In accordance with an embodiment, the circuitry 202 may be configured to generate the heatmap 310A of the physical space based on the detected smoke in the physical space, and further based on the output (such as the confidence score for each subset of pixels) of the trained neural network model 108 corresponding to the detection of the smoke.

In some embodiments, the neural network model 108 may be trained to generate the heatmap 310A. In an exemplary scenario, the heatmap 310A may be generated based on the features related to the subsets of pixels in the received first image 302A. For example, heatmap 310A may be a visual representation of the smoke in the physical space. In case the smoke is localized at a specific spot, such as, the surgical site of the surgical procedure, the concentration of the smoke at the surgical site may be distinguishable from other regions of the physical space using a specific color scheme in the heatmap 310A. The circuitry 202 may assign a color corresponding to each subset of pixels of the first image 302A, based on the concentration of the detected smoke at different regions of the first image 302A. For example, the color scheme of the heatmap 310A may comprise a dark red color for high concentration of the smoke, a bright orange color for medium concentration of the smoke, and yellow color for low concentration of the smoke. The color scheme of the heatmap 310A may further comprise a blue color corresponding to the pixels in which the smoke may be absent. For example, the circuitry 202 may assign a dark blue color corresponding to the pixels which may have no trace of the detected smoke. In another example, the circuitry 202 may assign a light blue color corresponding to the pixels which may have a slight trace of the smoke. It may be noted that other color schemes may be used for the heatmap to represent the concentration or the intensity of the smoke, without departing from the scope of the disclosure.

At 312, based on the trained neural network model 108, the smoke corresponding to each subset of pixels of the received first image 302A may be classified into a specific category among a plurality of categories of intensity of the smoke. In accordance with an embodiment, the circuitry 202 may be configured to classify the smoke corresponding to each subset of pixels of the received first image 302A into a specific category among a plurality of categories of intensity of the smoke, based on the trained neural network model 108. The classification may be based on the confidence score corresponding to each subset of pixels.

The plurality of categories may include, for example, the light intensity smoke, the medium intensity smoke, and the heavy intensity smoke. In an exemplary scenario, the smoke (such as dense smoke) may be concentrated in the vicinity of the electrocautery device during the surgical procedure. The neural network model 108 may output the confidence score for the pixels corresponding to the smoke detected in the vicinity of the electrocautery device as 0.92. Based on the detection of the smoke and the confidence score, the neural network model 108 may classify the smoke in the vicinity of the electrocautery device in the first image 302A as the heavy intensity smoke.

Further, the smoke around the electrocautery device may be lighter in density as compared to the smoke in the vicinity of the electrocautery device. The neural network model 108 may output the confidence score for the pixels corresponding to the smoke detected around the electrocautery device in the first image 302A as 0.90. Based on the detection of the smoke and the confidence score, the neural network model 108 may classify the smoke around the electrocautery device in the first image 302A as the medium intensity smoke.

Furthermore, the smoke away from the electrocautery device may be lighter in density as compared to the smoke around the electrocautery device. The neural network model 108 may output the confidence score for the pixels corresponding to the smoke detected away from the electrocautery device in the first image 302A as 0.86. Based on the detection of the smoke and the confidence score, the neural network model 108 may classify the smoke away from the electrocautery device in the first image 302A as the light intensity smoke.

In accordance with an embodiment, the circuitry 202 may receive a user input corresponding to the detection of the smoke of a user-defined category among the plurality of categories. In an exemplary scenario, the circuitry 202 may receive the user input from the surgeon performing the surgical procedure or the assisting staff. For example, the surgeon may require evacuation of the smoke from the physical space when the smoke is the heavy intensity smoke. The circuitry 202 may receive the user input from the surgeon corresponding to the detection of the "heavy intensity smoke". The circuitry 202 may utilize the classification of the smoke by the neural network model 108 to detect the heavy intensity smoke for subsequent evacuation based on user input.

At 314, weights may be assigned to the heatmap 310A based on the classification of the smoke. In accordance with an embodiment, the circuitry 202 may be configured to assign the weights to the heatmap 310A based on the classification of the smoke. In an exemplary scenario, the assigned weights may be in a range of 0 to 1. For example, a weight of "1" may be assigned to one or more first regions of the heatmap 310A corresponding to the pixels that include the smoke classified as the heavy intensity smoke. A weight of "0.5" may be assigned to one or more second regions of the heatmap 310A corresponding to the pixels that include the smoke classified as the medium intensity smoke. A weight of "0.1" may be assigned to one or more third regions of the heatmap 310A corresponding to the pixels that include the detected smoke classified as the light intensity smoke. A weight of "0" may be assigned to one or more fourth regions of the heatmap 310A corresponding to the pixels that include no detected smoke. It may be noted that the scale of 0 to 1 for the weights is merely presented as an example, and other scales may be used for the assignment of weights to the heatmap 310A, without departing from the scope of the disclosure.

At 316, based on the assigned weights, a plurality of regions may be determined. Each region of the plurality of regions may correspond to the specific category of the plurality of categories. In accordance with an embodiment, the circuitry 202 may be configured to determine the plurality of regions, each corresponding to the specific category of the plurality of categories, based on the assigned weights. Each region of the plurality of regions may include the subset of pixels classified into the specific category. In some embodiments, the circuitry 202 may determine the plurality of regions based on bounding boxes predicted to include an object of interest (such as smoke) by the trained neural network model 108. The trained neural network model 108 may predict bounding boxes to detect objects (such as smoke) in the first image 302A. For example, the bounding boxes may define the boundaries (rectangular or circular boundaries) of the plurality of regions that may include the detected smoke of different categories. In accordance with an embodiment, the output of the trained neural network model 108 may include bounding box coordinates for the object of interest (such as smoke).

For example, the circuitry 202 may determine the plurality of regions, such as a first region 316A, a second region 316B, a third region 316C, a fourth region 316D, a fifth region 316E, and a sixth region 316F in the generated heatmap 310A. In an exemplary scenario, the determined first region 316A may correspond to the category of the heavy intensity smoke, based on the assigned weight of "1" to the pixels corresponding to the first region 316A. The determined second region 316B may correspond to the category of the medium intensity smoke, based on the assigned weight of "0.5" to the pixels corresponding to the second region 316B. The third region 316C may correspond to the category of the light intensity smoke, based on the assigned weight of "0.1" to the pixels corresponding to the third region 316C. The fourth region 316D may correspond to the category of the medium intensity smoke, based on the assigned weight of "0.5" to the pixels corresponding to the fourth region 316D. The fifth region 316E may correspond to the category of the light intensity smoke, based on the assigned weight of "0.1" to the pixels corresponding to the fifth region 316E. The sixth region 316F may correspond to the category of the medium intensity smoke, based on the assigned weight of "0.5" to the pixels corresponding to the sixth region 316F.

Although illustrated with discrete blocks, the exemplary operations associated with one or more blocks of the block diagram 300A may be divided into additional blocks, combined into fewer blocks, or eliminated, depending on implementation of the exemplary operations.

Figure 3B:
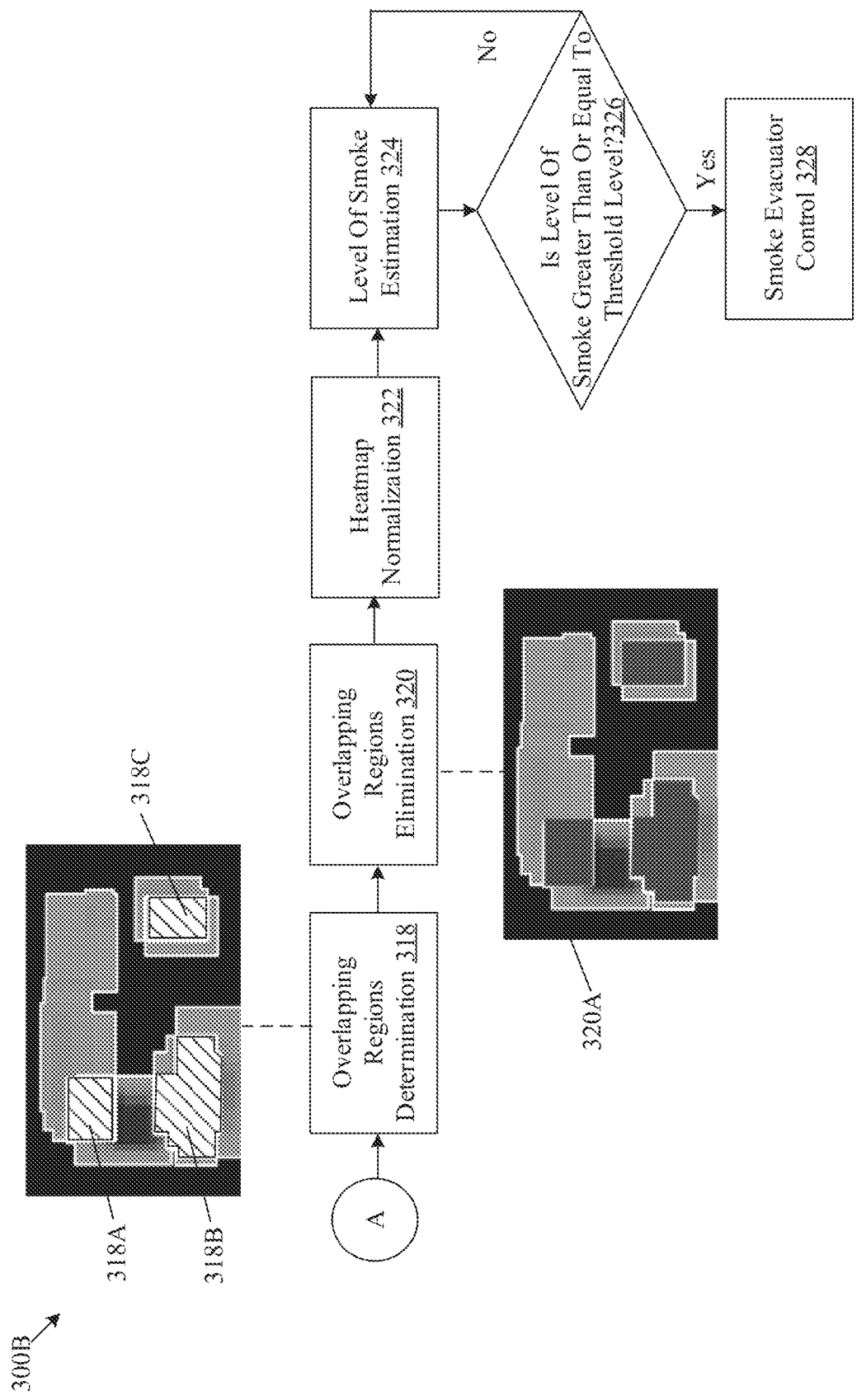

FIG. 3B illustrates exemplary operations for smoke level estimation, in accordance with an embodiment of the disclosure. FIG. 3B is explained in conjunction with elements from FIG. 1 and FIG. 2. With reference to FIG. 3B, there is shown a block diagram 300B that illustrates exemplary operations from 318 to 328, as described herein. Control may pass from block 316 in FIG. 3A to block 318.

At 318, one or more overlapping regions may be determined between the determined plurality of regions (such as the first region 316A, the second region 316B, the third region 316C, the fourth region 316D, the fifth region 316E, and the sixth region 316F). In accordance with an embodiment, the circuitry 202 may be configured to determine the overlapping regions, such as a first overlapping region 318A, a second overlapping region 318B, and a third overlapping region 318C.

For example, the circuitry 202 may determine the first overlapping region 318A between the first region 316A and the second region 316B. The circuitry 202 may determine the second overlapping region 318B between the third region 316C and the fourth region 316D. The circuitry 202 may determine the third overlapping region 318C between the first region 316A, the fifth region 316E and the sixth region 316F. For example, the first region 316A and the second region 316B may overlap due to close positioning of one or more subsets of the pixels of one region (such as the first region 316A) with the one or more subsets of the pixels of another region (such as the second region 316B). In some instances, the first region 316A and the second region 316B of the heatmap 310A may overlap due to the classification of smoke by the neural network model 108 in the same region of the physical space as both heavy intensity smoke and light intensity smoke.

At 320, the one or more overlapping regions may be eliminated from the heatmap 310A. In accordance with an embodiment, the circuitry 202 may be configured to eliminate the overlapping regions from the heatmap 310A. For example, the circuitry 202 may eliminate the first overlapping region 318A, the second overlapping region 318B, and the third overlapping region 318C from the heatmap 310A to obtain a heatmap 320A.

For example, the circuitry 202 may determine the first overlapping region 318A (such as the overlapped region between the first region 316A and the second region 316B) to include both categories of smoke (such as the heavy intensity smoke and the medium intensity smoke). The circuitry 202 may eliminate the first overlapping region 318A to remove regions of the heatmap 310A that may indicate less than 100% accuracy of classification of the smoke. Similarly, the circuitry 202 may eliminate the second overlapping region 318B and the third overlapping region 318C to obtain the heatmap 320A.

At 322, the heatmap 320A may be normalized. In accordance with an embodiment, the circuitry 202 may be configured to normalize the heatmap 320A. Examples of the normalization methods utilized by the circuitry 202 may include, but are not limited to, min-max feature scaling method, coefficient of variation method, standardized moment method, sigmoid function method, studentized residual method, and standard score method. The values of the heatmap 320A may be normalized to obtain a single value for smoke estimation in the range of 0 to 1. In an embodiment, the assigned weights for each region of the plurality of regions may be used for the normalization of the heatmap 320A. In another embodiment, the normalization of the heatmap 320A may further include an averaging process to obtain the average of the weights assigned to the plurality of regions (such as regions 316A-316F) in the heatmap 320A.

At 324, the level of smoke may be estimated. In accordance with an embodiment, the circuitry 202 may be configured to estimate the level of smoke based on the elimination of the overlapping regions and normalization of the heatmap 320A. In some embodiments, the estimated level of the smoke in the first image 302A of the physical space may be in a range of 0 to 1, with the value of 0 indicating the lowest level of smoke and the value of 1 indicating the highest level of smoke.

For example, the heatmap 320A may include the six regions such as the first region 316A, the second region 316B, the third region 316C, the fourth region 316D, the fifth region 316E, and the sixth region 316F. The first region 316A may be associated with the weight of "1", the second region 316B may be associated with the weight of "0.5", and the third region 316C may be associated with the weight of "0.1". The fourth region 316D may be associated with the weight of "0.5", the fifth region 316E may be associated with the weight of "0.1" and the sixth region 316F may be associated with the weight of "0.5". Based on the assigned weights of the six regions, the circuitry 202 may estimate the level of smoke of the entire physical space between the range of 0 and 1. For example, the circuitry 202 may estimate the level of smoke to be "0.55" based on the normalization and the averaging process.

At 326, the estimated level of smoke may be determined to be greater than or equal to a threshold level (for example 0.5). In accordance with an embodiment, the circuitry 202 may be configured to determine the estimated level of smoke to be greater than or equal to the threshold level.

At 328, the smoke evacuator 116 may be controlled based on the determination that the level of smoke is greater than or equal to the threshold level. In accordance with an embodiment, the circuitry 202 may be configured to control the smoke evacuator 116 based on the determination that the estimated level of smoke is greater than or equal to the threshold level. For example, the estimated level of smoke may be 0.55 which may be greater than the threshold level 0.5. The circuitry 202 may control the smoke evacuator 116 to evacuate the smoke from the physical space to bring the level of smoke below the threshold level.

In accordance with an embodiment, the circuitry 202 may be configured to switch-on the smoke evacuator 116 to evacuate the smoke in case the estimated level of the smoke in the physical space is greater than or equal to the threshold level. The circuitry 202 may switch-on the smoke evacuator 116 in case the level of smoke may be 0.55. The circuitry 202 may further switch-off the smoke evacuator 116 in case the estimated level of the smoke in the physical space falls below the threshold level. After evacuation of the smoke, the circuitry 202 may process subsequent frames (such as the second image 106B to Nth image 106N) from the video stream of the surgical procedure to determine the level of the smoke in the real time. For example, the circuitry 202 may switch-off the smoke evacuator 116 in case the level of the smoke in the physical space reaches 0.45 which is below the threshold level (such as 0.5). The circuitry 202 may repeat the process of switching on the smoke evacuator 116 in case the estimated level of the smoke in the physical space (such as the surgical site or the operation room) raises above the threshold level during the surgical procedure.

Although illustrated with discrete blocks, the exemplary operations associated with one or more blocks of the block diagram 300B may be divided into additional blocks, combined into fewer blocks, or eliminated, depending on implementation of the exemplary operations.

Figure 4A:
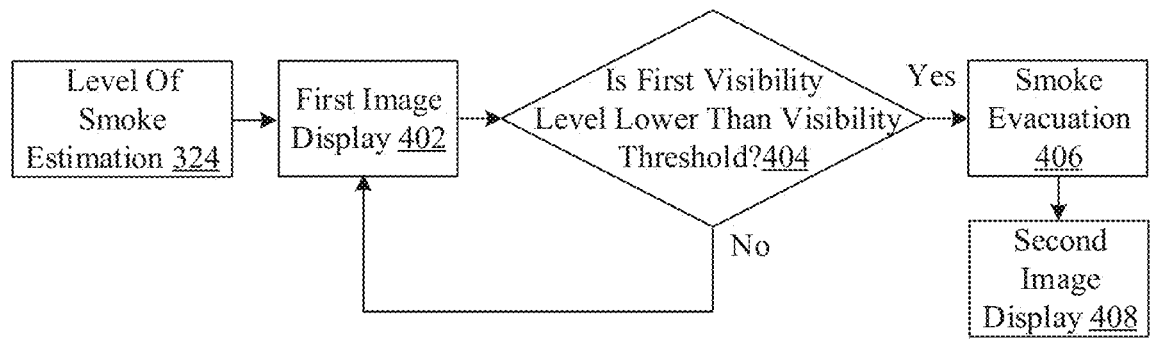
FIGS. 4A and 4B illustrate exemplary methods for enhancement of visibility of a physical space based on smoke level estimation, in accordance with an embodiment of the disclosure.

FIG. 4A illustrates an exemplary method for enhancement of visibility of a physical space based on smoke level estimation, in accordance with an embodiment of the disclosure. FIG. 4A is explained in conjunction with elements from FIGS. 1, 2, 3A, and 3B. With reference to FIG. 4A, there is shown a block diagram 400A that illustrates exemplary operations from 402 to 408, as described herein. The exemplary operations illustrated in the block diagram 400A may start at 402 and may be performed by any computing system, apparatus, or device, such as by the electronic device 102 of FIG. 1 or the circuitry 202 of FIG. 2.

At 402, the display screen 206A may be controlled to display a first image (such as the first image 106A or the first image 302A) based on the estimated level of smoke (as described at 324 in FIG. 3B). In accordance with an embodiment, the circuitry 202 may be configured to control the display screen 206A to display the first image 302A. In an exemplary scenario, the circuitry 202 may receive the first image 302A from the image capturing apparatus 114 in real time during the surgical procedure (such as in an online mode), and may display the first image 302A in real time for assistance to the personnel, such as, the surgeon performing the surgical procedure. The first image 302A may indicate a first visibility level of the physical space (such as the surgical site or the operation room) based on the estimated level of the smoke (as described at 324 in FIG. 3B). For example, the estimated level of smoke may be 0.7. In some embodiments, the first visibility level may be in a range of 0 to 1, with "0" being the lowest visibility level and "1" being the highest visibility level. It may be noted that the higher the estimated level of smoke, the lower the visibility level of the physical space may be, and vice versa. In an exemplary scenario, the first visibility level of the physical space may be low (for example, 0.43) based on the estimated level of the smoke.

At 404, the first visibility level may be determined to be lower than a visibility threshold. In accordance with an embodiment, the circuitry 202 may determine the first visibility level to be lower than the visibility threshold. For example, the visibility threshold may be 0.8. In an embodiment, the visibility threshold may be set by user input based on preferences of the surgeon or the assisting staff. In another embodiment, the visibility threshold may be set by the neural network model 108, and may be different for each application (such as a type of surgery) or environment conditions of the physical space (such as lighting conditions). In another embodiment, the visibility threshold may be set based on experimentation by simulation of different levels of smoke, and selection of a visibility level where the vision of the surgical field is not affected as the visibility threshold.

At 406, the smoke evacuator 116 may be controlled to evacuate the smoke from the physical space based on the determination that the first visibility level (such as 0.43) may be lower than the visibility threshold (such as 0.8). The circuitry 202 may control the smoke evacuator 116 to evacuate the smoke from the physical space. The circuitry 202 may control the smoke evacuator 116 in real time during the surgical procedure (such as in the online mode). Details of the control of the smoke evacuator 116 are provided, for example, in FIG. 3B.

At 408, the display screen 206A may be controlled to display a second image (for example, the second image 106B) of the plurality of images 106 of the physical space based on the evacuation of the smoke. In accordance with an embodiment, the circuitry 202 may be configured to control the display screen 206A to display the second image 106B of the plurality of images 106 of the physical space based on the evacuation of the smoke. The second image 106B may indicate a second visibility level greater than or equal to the visibility threshold (such as 0.8). For example, the second visibility level of the second image 106B may be 0.9, based on the evacuation of the smoke from the physical space. Thus, the electronic device 102 may improve the visibility of the surgical site in real time during the surgical procedure, and may provide a health working environment for the surgeon and the assisting staff.

Although illustrated with discrete blocks, the exemplary operations associated with one or more blocks of the block diagram 400A may be divided into additional blocks, combined into fewer blocks, or eliminated, depending on implementation of the exemplary operations.

Figure 4B:
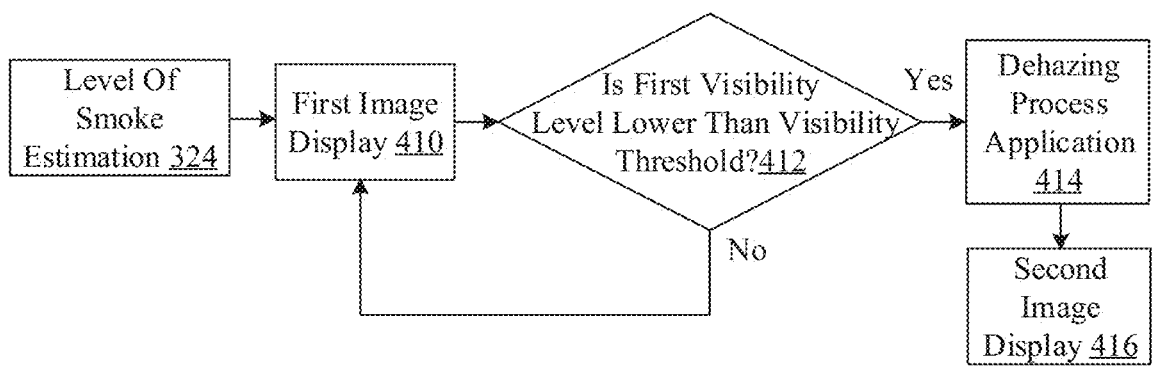

FIG. 4B illustrates an exemplary method for enhancement of visibility of a physical space based on smoke level estimation, in accordance with an embodiment of the disclosure. FIG. 4B is explained in conjunction with elements from FIGS. 1, 2, 3A, 3B, and 4A. With reference to FIG. 4B, there is shown a block diagram 400B that illustrates exemplary operations from 410 to 416, as described herein. The exemplary operations illustrated in the block diagram 400B may start at 410 and may be performed by any computing system, apparatus, or device, such as by the electronic device 102 of FIG. 1 or the circuitry 202 of FIG. 2.

At 410, the display screen 206A may be controlled to display the first image 302A based on the estimated level of smoke (as described at 324 in FIG. 3B). In accordance with an embodiment, the circuitry 202 may be configured to control the display screen 206A to display the first image 302A. In an exemplary scenario, the circuitry 202 may receive the first image 302A from the image capturing apparatus 114 in an offline mode, and may display the first image 302A subsequent to the surgical procedure. The first image 302A may indicate the first visibility level of the physical space based on the estimated level of the smoke. The display of the first image 302A at 410 may be same as the display of the first image 302A at 402. Details of the display of the first image 302A are provided, for example, at 402 in FIG. 4A.

At 412, the first visibility level may be determined to be lower than the visibility threshold. In accordance with an embodiment, the circuitry 202 may determine the first visibility level to be lower than the visibility threshold (such as 0.8).

At 414, a dehazing process (such as image dehazing) may be applied on the first image 302A based on the determination that the first visibility level may be lower than the visibility threshold. In accordance with an embodiment, the circuitry 202 may be configured to apply the dehazing process on the first image 302A based on the determination that the first visibility level may be lower than the visibility threshold. The dehazing process may be applied on the first image 302A to remove the influence of the smoke from the first image 302A, and to provide a haze-free image that may have improved contrast and color appearance. For example, the dehazing process may be based on deep learning based techniques. The dehazing process may be based on a computer vision technique, a deep multi-model fusion network method, a densely connected pyramid dehazing network (DCPDN) method, a feature fusion attention network (FFA-Net) architecture method, and so forth. The circuitry 202 may apply the dehazing process in the offline mode, for example, subsequent to the surgical procedure. The dehazing process may be utilized for image enhancement applications. In some embodiments, the circuitry 202 may also apply the dehazing process in the online mode for the image enhancement of the first image 302A during the surgical procedure.

At 416, the display screen 206A may be controlled to display the second image 106B of the plurality of images 106 of the physical space based on the application of the dehazing process. In accordance with an embodiment, the circuitry 202 may be configured to control the display screen 206A to display the second image 106B of the plurality of images 106 of the physical space based on the application of the dehazing process. The second image 106B may indicate the second visibility level greater than or equal to the visibility threshold. For example, the second visibility level of the second image 106B may be 0.95, after the application of the dehazing process.

Although illustrated with discrete blocks, the exemplary operations associated with one or more blocks of the block diagram 400B may be divided into additional blocks, combined into fewer blocks, or eliminated, depending on implementation of the exemplary operations.

Figure 5:
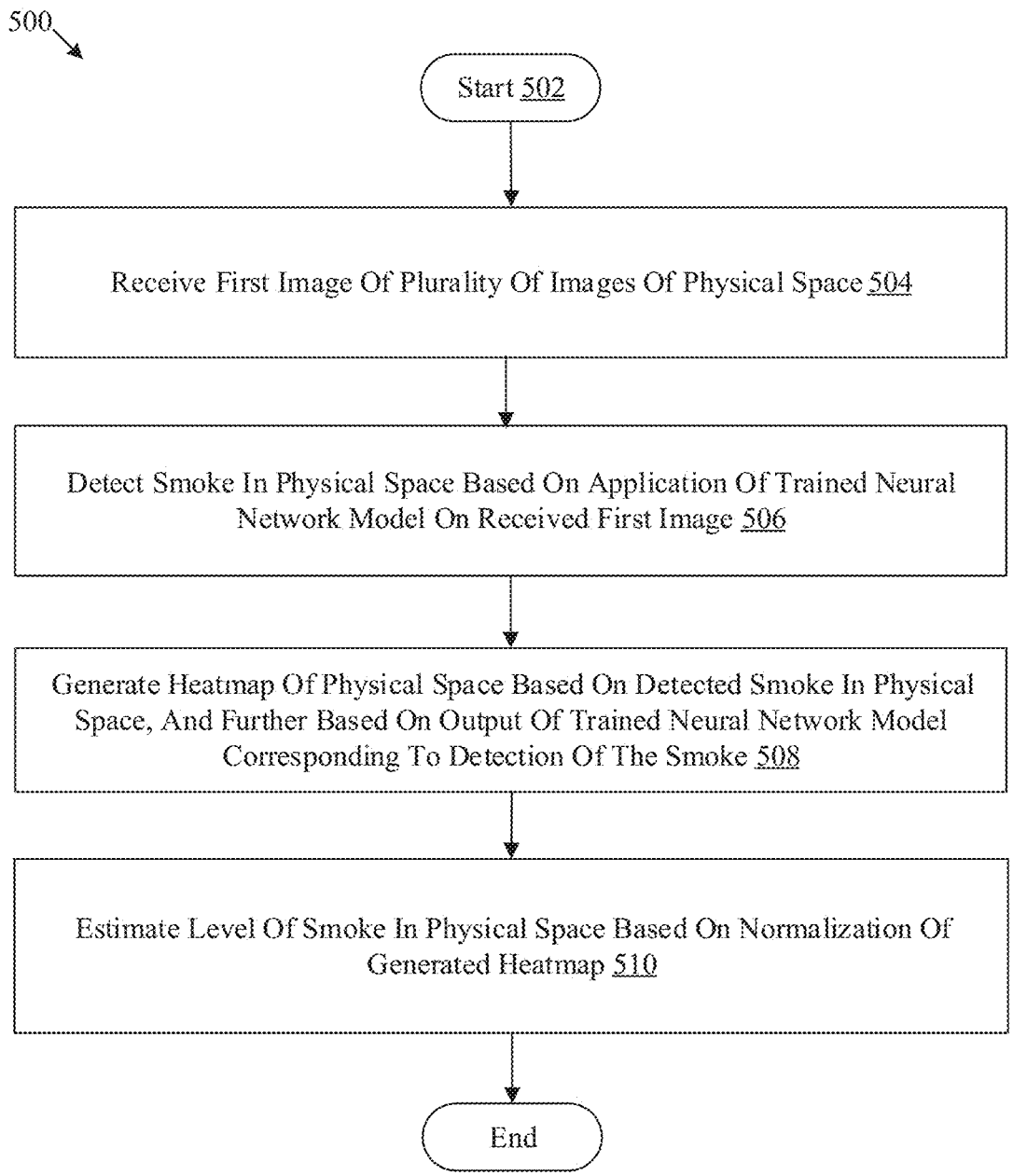
FIG. 5 is a flowchart that illustrates an exemplary method for smoke level estimation, in accordance with an embodiment of the disclosure.

FIG. 5 is a flowchart that illustrates an exemplary method for smoke level estimation, in accordance with an embodiment of the disclosure. FIG. 5 is explained in conjunction with elements from FIGS. 1, 2, 3A, 3B, 4A and 4B. With reference to FIG. 5, there is shown a flowchart 500. The method illustrated in the flowchart 500 may be executed by any computing system, such as by the electronic device 102 or the circuitry 202. The method may start at 502 and proceed to 504.

At 504, a first image (such as the first image 106A) of a plurality of images (such as the plurality of images 106) of a physical space (such as a surgical site or an operation room) may be received. In accordance with an embodiment, the circuitry 202 may be configured to receive the first image 106A of the plurality of images 106 of the physical space. Details of the reception of the first image 106A are further provided, for example, in FIG. 3A.

At 506, smoke may be detected in the physical space based on an application of a trained neural network model (such as the neural network model 108) on the received first image 106A. In accordance with an embodiment, the circuitry 202 may be configured to detect the smoke in the physical space based on the application of the trained neural network model 108 on the received first image 106A. Details of detection of the smoke are further provided, for example, in FIG. 3A.

At 508, a heatmap (such as the heatmap 110) of the physical space may be generated based on the detected smoke in the physical space, and further based on an output of the trained neural network model 108 corresponding to the detection of the smoke. In accordance with an embodiment, the circuitry 202 may be configured to generate the heatmap 110 of the physical space based on the detected smoke in the physical space, and further based on an output of the trained neural network model 108 corresponding to the detection of the smoke. Details of the generation of the heatmap 110 are further provided, for example, in FIG. 3A.

At 510, a level of the smoke in the physical space may be estimated based on a normalization of the generated heatmap 110. In accordance with an embodiment, the circuitry 202 may be configured to estimate the level of the smoke in the physical space based on the normalization of the generated heatmap 110. Details of the estimation of the level of smoke are further provided, for example, in FIG. 3B. Control may pass to end.

Although the flowchart 500 is illustrated as discrete operations, such as 502, 504, 506, 508 and 510, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer (such as the electronic device 102). The instructions may cause the machine and/or computer to perform operations that may include receiving a first image (such as the first image 106A) of a plurality of images (such as the plurality of images 106) of a physical space. The operations may further include detecting smoke in the physical space based on an application of a trained neural network model (such as the neural network model 108) on the received first image 106A. The operations may further include generating a heatmap (such as the heatmap 110) of the physical space based on the detected smoke in the physical space, and further based on an output of the trained neural network model 108 corresponding to the detection of the smoke. The operations may further include estimating a level of the smoke in the physical space based on a normalization of the generated heatmap 110.

Exemplary aspects of the disclosure may provide an electronic device (such as the electronic device 102 of FIG. 1) that includes circuitry (such as the circuitry 202). The circuitry 202 may be configured to receive a first image (such as the first image 106A) of a plurality of images (such as the plurality of images 106) of a physical space. The circuitry 202 may be further configured to detect smoke in the physical space based on an application of a trained neural network model (such as the neural network model 108) on the received first image 106A. The circuitry 202 may be further configured to generate a heatmap (such as the heatmap 110) of the physical space based on the detected smoke in the physical space, and further based on an output of the trained neural network model 108 corresponding to the detection of the smoke. The circuitry 202 may be further configured to estimate a level of the smoke in the physical space based on a normalization of the generated heatmap 110.

In accordance with an embodiment, the circuitry 202 may be further configured to obtain a confidence score corresponding to each subset of pixels of a plurality of pixels of the received first image 106A as the output of the trained neural network model 108. The confidence score may be associated with the detection of the smoke corresponding to each subset of pixels of the received first image 106A. The circuitry 202 may further generate the heatmap 110 based on the confidence score for each subset of pixels.

In accordance with an embodiment, the circuitry 202 may be further configured to classify, based on the trained neural network model 108, the smoke corresponding to each subset of pixels of the received first image 106A into a specific category among a plurality of categories of intensity of the smoke. The classification may be based on the confidence score corresponding to each subset of pixels. The circuitry 202 may further assign weights to the heatmap 110 based on the classification of the smoke.

In accordance with an embodiment, the circuitry 202 may be further configured to determine a plurality of regions (such as the first region 316A, the second region 316B, . . . the sixth region 316F), each corresponding to the specific category of the plurality of categories, based on the assigned weights. Each region of the plurality of regions may include the subset of pixels classified into the specific category. The circuitry 202 may further determine one or more overlapping regions (such as the first overlapping region 318A, the second overlapping region 318B, and the third overlapping region 318C) between the determined plurality of regions (such as the first region 316A, the second region 316B, . . . the sixth region 316F). The circuitry 202 may further eliminate the one or more overlapping regions from the heatmap 110. The circuitry 202 may further estimate the level of the smoke in the physical space based on the elimination of the one or more overlapping regions (such as the first overlapping region 318A, the second overlapping region 318B, and the third overlapping region 318C).

In accordance with an embodiment, the circuitry 202 may be further configured to receive a user input. The user input may correspond to the detection of the smoke of a user-defined category among the plurality of categories.

In accordance with an embodiment, the estimated level of the smoke in the first image of the physical space may be in a range of 0 to 1.

In accordance with an embodiment, the circuitry 202 may be configured to receive the first image 106A of the plurality of images 106 from at least one of an imaging sensor in real-time, a memory of the electronic device 102, or a server (such as the server 104).

In accordance with an embodiment, the circuitry 202 may be further configured to control a smoke evacuator (such as the smoke evacuator 116) to evacuate the smoke from the physical space based on the estimated level of the smoke.

In accordance with an embodiment, the circuitry 202 may be further configured to switch-on the smoke evacuator 116 to evacuate the smoke in case the estimated level of the smoke in the physical space is greater than or equal to a threshold level. The circuitry 202 may be further configured to switch-off the smoke evacuator 116 in case the estimated level of the smoke in the in the physical space falls below the threshold level. In accordance with an embodiment, the threshold level may be 0.5.

In accordance with an embodiment, the circuitry 202 may be further configured to control a display screen (such as the display screen 206A) to display the first image 106A indicating a first visibility level of the physical space based on the estimated level of the smoke. The circuitry 202 may further control the smoke evacuator 116 to evacuate the smoke from the physical space in case the first visibility level is lower than a visibility threshold. The circuitry 202 may further control the display screen 206A to display a second image (such as the second image 106B) of the plurality of images 106 of the physical space based on the evacuation of the smoke. The second image 106B may indicate a second visibility level greater than or equal to the visibility threshold.

In accordance with an embodiment, the circuitry 202 may be further configured to control the display screen 206A to display the first image 106A indicating a first visibility level of the physical space based on the estimated level of the smoke. The circuitry 202 may further apply a dehazing process on the first image 106A in case the first visibility level is lower than a visibility threshold. The circuitry 202 may further control the display screen 206A to display the second image 106B of the plurality of images 106 of the physical space based on the application of the dehazing process. The second image 106B may indicate a second visibility level greater than or equal to the visibility threshold.

In accordance with an embodiment, the circuitry 202 may be further configured to train a neural network model on one or more features related to one or more subsets of pixels in the received first image 106A to obtain the trained neural network model 108. The neural network model 108 may be trained to detect the smoke and to generate the heatmap 110. The one or more features may include at least one of an intensity of the smoke in the one or more subsets of pixels, a shape of the smoke in the one or more subsets of pixels, or a color of the smoke in the one or more subsets of pixels.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   receive a first image of a plurality of images of a physical space;
   train a neural network model on a plurality of features corresponding to at least one subset of pixels of a plurality of pixels of the received first image, wherein
      the trained neural network model is for detection of a smoke in the physical space and generation of a heatmap of the physical space, and
      the plurality of features comprises a shape of the smoke in the at least one subset of pixels and a color of the smoke in the at least one subset of pixels;
   detect the smoke in the physical space by application of the trained neural network model on the received first image;
   generate the heatmap of the physical space based on
      the detected smoke in the physical space,
      a classification of the detected smoke by the trained neural network model, and
      an output of the trained neural network model corresponding to the detection of the smoke, wherein
         the generated heatmap indicates an intensity of the detected smoke and a magnitude of the detected smoke in the physical space,
         the intensity of the detected smoke includes a plurality of categories, and
         the plurality of categories includes a light intensity smoke, a medium intensity smoke, and a heavy intensity smoke;
   normalize the generated heatmap; and
   estimate a level of the smoke in the physical space based on the normalization of the generated heatmap.

2. The electronic device according to claim 1, wherein the circuitry is further configured to:
   obtain a confidence score corresponding to each subset of pixels of the plurality of pixels of the received first image as the output of the trained neural network model, wherein the confidence score corresponds to the detection of the smoke in the each subset of pixels of the plurality of pixels of the received first image; and
   generate the heatmap based on the confidence score for the each subset of pixels of the plurality of pixels of the received first image.

3. The electronic device according to claim 2, wherein the circuitry is further configured to:
   classify the smoke corresponding to the each subset of pixels of the plurality of pixels of the received first image in a specific category from the plurality of categories of the intensity of the smoke, wherein the classification is based on the trained neural network model and the confidence score corresponding to the each subset of pixels of the plurality of pixels of the received first image; and
   assign weights to the heatmap based on the classification of the smoke.

4. The electronic device according to claim 3, wherein the circuitry is further configured to:
   determine a plurality of regions based on the assigned weights, wherein
      each region of the plurality of regions corresponds to the specific category of the plurality of categories,
      the each region of the plurality of regions includes a specific subset of pixels that corresponds to the classified smoke, and
      the specific subset of pixels is from the at least one subset of pixels of the plurality of pixels;
   determine at least one overlapping region between the determined plurality of regions;
   eliminate the at least one overlapping region from the heatmap; and
   estimate the level of the smoke in the physical space based on the elimination of the at least one overlapping region.

5. The electronic device according to claim 3, wherein the circuitry is further configured to receive a user input, and
   the user input corresponds to the detection of the smoke of a user-defined category from the plurality of categories.

6. The electronic device according to claim 1, wherein the estimated level of the smoke in the first image of the physical space is in a range of 0 to 1.

7. The electronic device according to claim 1, wherein the circuitry is further configured to receive the first image of the plurality of images from at least one of an imaging sensor in real-time, a memory of the electronic device, or a server.

8. The electronic device according to claim 1, wherein the circuitry is further configured to control, based on the estimated level of the smoke, a smoke evacuator to evacuate the smoke from the physical space.

9. The electronic device according to claim 8, wherein the circuitry is further configured to:
   switch-on the smoke evacuator, based on determination that the estimated level of the smoke in the physical space is greater than or equal to a threshold level, to evacuate the smoke from the physical space; and
   switch-off the smoke evacuator based on determination that the estimated level of the smoke in the physical space is below the threshold level.

10. The electronic device according to claim 9, wherein the threshold level is 0.5.

11. The electronic device according to claim 1, wherein the circuitry is further configured to:
    control, based on the estimated level of the smoke, a display screen to display the first image that indicates a first visibility level of the physical space;
    control a smoke evacuator, based on determination that the first visibility level is lower than a visibility threshold, to evacuate the smoke from the physical space; and
    control, based on the evacuation of the smoke, the display screen to display a second image of the plurality of images of the physical space, wherein the second image indicates a second visibility level greater than or equal to the visibility threshold.

12. The electronic device according to claim 1, wherein the circuitry is further configured to:

control, based on the estimated level of the smoke, a display screen to display the first image that indicates a first visibility level of the physical space;

apply a dehazing process on the first image based on determination that the first visibility level is lower than a visibility threshold; and control, based on the application of the dehazing process, the display screen to display a second image of the plurality of images of the physical space, wherein the second image indicates a second visibility level greater than or equal to the visibility threshold.

13. The electronic device according to claim 1, wherein the plurality of features further comprises the intensity of the smoke in the at least one subset of pixels.

14. A method, comprising:

receiving a first image of a plurality of images of a physical space;

training a neural network model on a plurality of features corresponding to at least one subset of pixels of a plurality of pixels of the received first image, wherein the trained neural network model is for detection of a smoke in the physical space and generation of a heatmap of the physical space, and the plurality of features comprises a shape of the smoke in the at least one subset of pixels and a color of the smoke in the at least one subset of pixels;

detecting the smoke in the physical space by applying the trained neural network model on the received first image;

generating the heatmap of the physical space based on the detected smoke in the physical space, a classification of the detected smoke by the trained neural network model, and an output of the trained neural network model corresponding to the detection of the smoke, wherein the generated heatmap indicates an intensity of the detected smoke and a magnitude of the detected smoke in the physical space, the intensity of the detected smoke includes a plurality of categories, and the plurality of categories includes a light intensity smoke, a medium intensity smoke, and a heavy intensity smoke;

normalizing the generated heatmap; and estimating a level of the smoke in the physical space based on the normalization of the generated heatmap.

15. The method according to claim 14, further comprising:

obtaining a confidence score corresponding to each subset of pixels of the plurality of pixels of the received first image as the output of the trained neural network model, wherein the confidence score is corresponding to the detection of the smoke in the each subset of pixels of the plurality of pixels of the received first image; and generating the heatmap based on the confidence score for the each subset of pixels of the plurality of pixels of the received first image.

16. The method according to claim 15, further comprising:

classifying the smoke corresponding to the each subset of pixels of the plurality of pixels of the received first image in a specific category from the plurality of categories of the intensity of the smoke, wherein the classification is based on the trained neural network model and the confidence score corresponding to the each subset of pixels of the plurality of pixels of the received first image; and assigning weights to the heatmap based on the classification of the smoke.

17. The method according to claim 16, further comprising:

determining a plurality of regions based on the assigned weights, wherein each region of the plurality of regions corresponds to the specific category of the plurality of categories, the each region of the plurality of regions includes a specific subset of pixels that corresponds to the classified smoke, and the specific subset of pixels is from the at least one subset of pixels of the plurality of pixels;

determining at least one overlapping region between the determined plurality of regions;

eliminating the at least one overlapping region from the heatmap; and estimating the level of the smoke in the physical space based on the elimination of the at least one overlapping region.

18. The method according to claim 14, further comprising controlling, based on the estimated level of the smoke, a smoke evacuator to evacuate the smoke from the physical space.

19. The method according to claim 14, further comprising:

controlling, based on the estimated level of the smoke, a display screen to display the first image indicating a first visibility level of the physical space;

controlling a smoke evacuator to evacuate the smoke from the physical space based on determination that the first visibility level is lower than a visibility threshold; and controlling, based on the evacuation of the smoke, the display screen to display a second image of the plurality of images of the physical space, wherein the second image indicates a second visibility level greater than or equal to the visibility threshold.

20. A non-transitory computer-readable medium having stored thereon, computer executable-instructions which, when executed by a processor, cause the processor to execute operations, the operations comprising:

receiving a first image of a plurality of images of a physical space;

training a neural network model on a plurality of features corresponding to at least one subset of pixels of a plurality of pixels of the received first image, wherein the trained neural network model is for detection of a smoke in the physical space and generation of a heatmap of the physical space, and the plurality of features comprises a shape of the smoke in the at least one subset of pixels and a color of the smoke in the at least one subset of pixels;

detecting the smoke in the physical space by applying the trained neural network model on the received first image;

generating the heatmap of the physical space based on the detected smoke in the physical space, a classification of the detected smoke by the trained neural network model, and an output of the trained neural network model corresponding to the detection of the smoke, wherein the generated heatmap indicates an intensity of the detected smoke and a magnitude of the detected smoke in the physical space, the intensity of the detected smoke includes a plurality of categories, and
the plurality of categories includes a light intensity smoke, a medium intensity smoke, and a heavy intensity smoke;
normalizing the generated heatmap; and
estimating a level of the smoke in the physical space based on the normalization of the generated heatmap.

* * * * *